Jan. 5, 1960
A. R. JOHNSON
2,920,303
ELECTRICAL TERMINAL BOX CONSTRUCTION WITH DETACHABLE
FACE PLATE AND WIRE TAPPING MEANS THEREFOR
Filed March 5, 1958
2 Sheets-Sheet 1
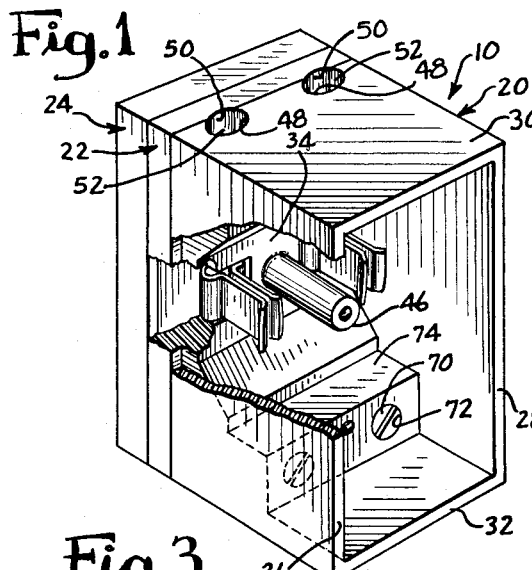
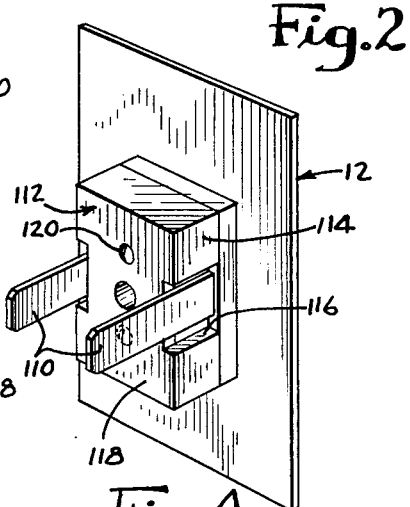
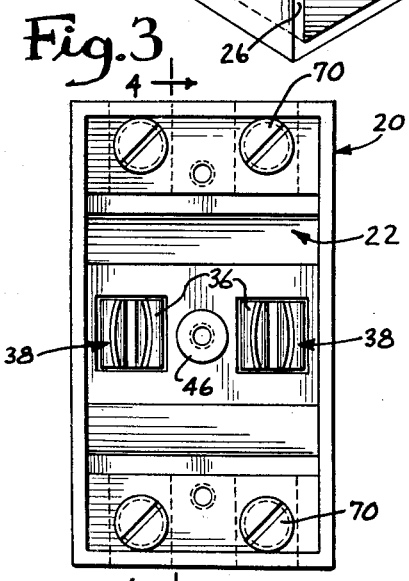
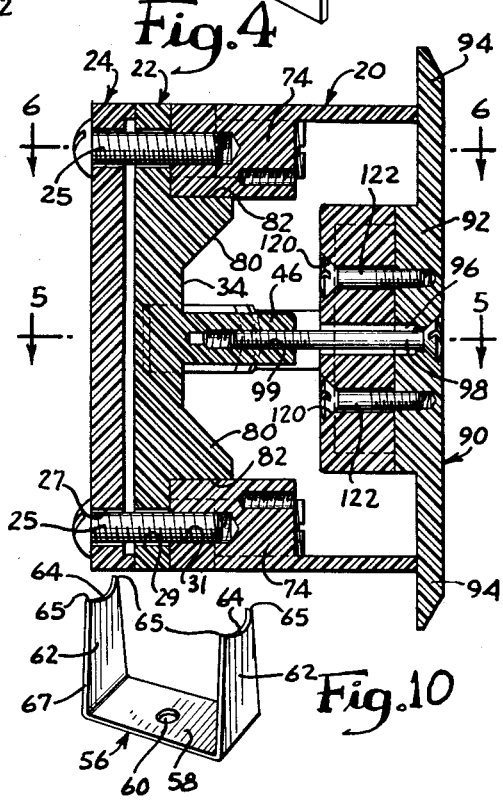
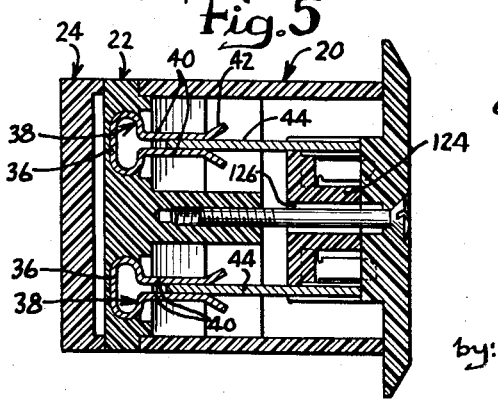
INVENTOR
ALLARD R. JOHNSON
by: Fred Gerlach
ATTY.

Jan. 5, 1960 A. R. JOHNSON 2,920,303
ELECTRICAL TERMINAL BOX CONSTRUCTION WITH DETACHABLE
FACE PLATE AND WIRE TAPPING MEANS THEREFOR
Filed March 5, 1958 2 Sheets-Sheet 2
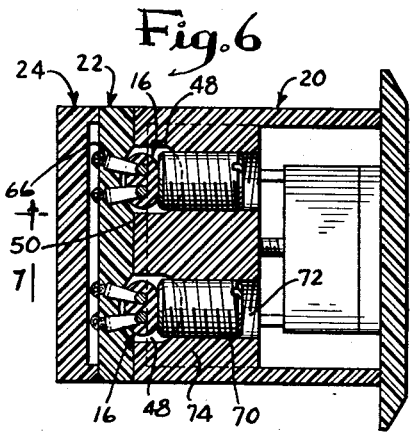
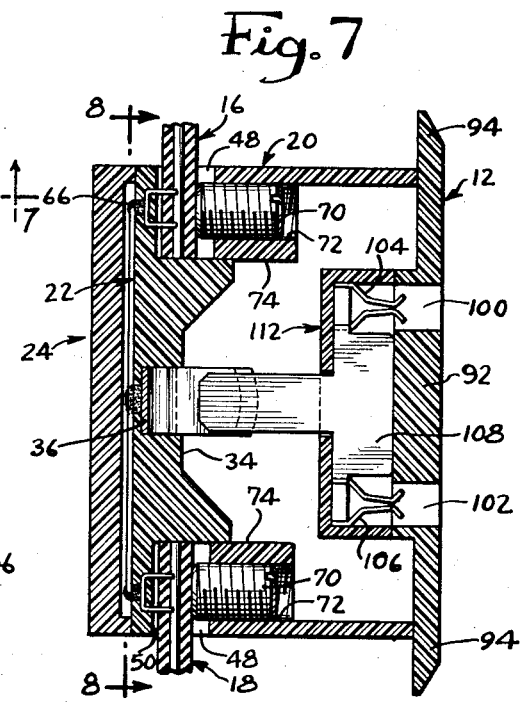
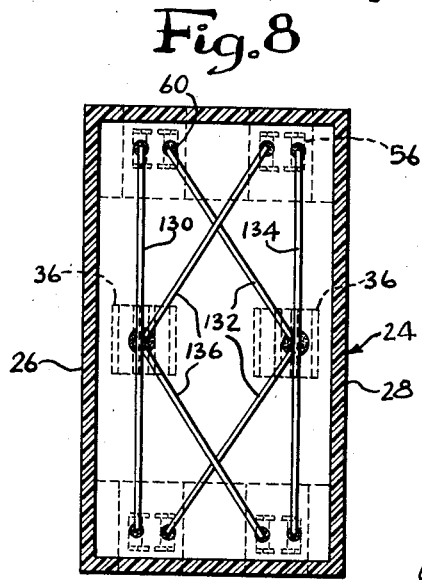
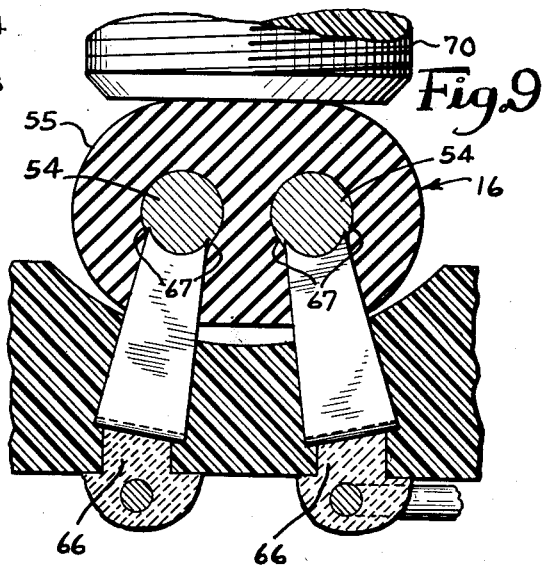
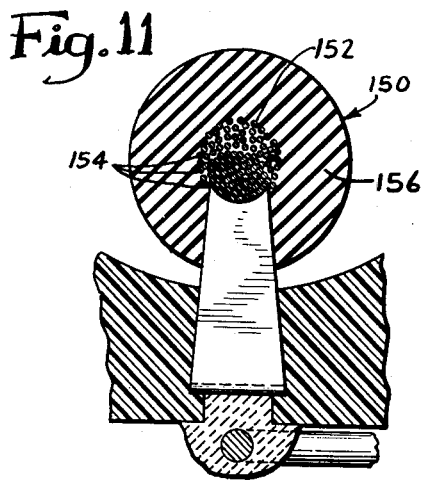
INVENTOR
ALLARD R. JOHNSON
by: Fred Gerlach
ATTY.

United States Patent Office 2,920,303
Patented Jan. 5, 1960

2,920,303

ELECTRICAL TERMINAL BOX CONSTRUCTION WITH DETACHABLE FACE PLATE AND WIRE TAPPING MEANS THEREFOR

Allard R. Johnson, Potlatch, Wash.

Application March 5, 1958, Serial No. 719,351

3 Claims. (Cl. 339—97)

The present invention relates to electrical terminal boxes and has particular reference to an improved terminal box having associated therewith a novel form of wire tapping means whereby the insulated electrical conductors leading to and extending from the box may have their ends securely anchored in position within the box with the metallic conductors proper making good electrical contact with the electric terminals associated with the box. The invention is also concerned with a novel form of wire tap proper, such tap being of the so-called "stab contact" type wherein electrical contact between the metallic conductor proper of an insulated electrical conductor assembly or cable is effected by causing the insulation surrounding the conductor to be pierced by a contact pin or member which constitutes a take-off device whereby electric current may be tapped from the conductor and supplied to a remote terminal through the media of suitable wiring.

The improved terminal box comprising the present invention is of the general type shown and described in my copending application Serial No. 641,214, filed on February 19, 1957, and now Patent No. 2,860,317, and by amended change of title, entitled "Electrical Terminal Box with Detachable Face Plate," over which the present terminal box is an improvement. The improvement of the present invention consists, in part, in the provision of a more effective form of stab type contact proper capable of making better electrical contact with the conductors proper of the insulated lead-in cables for the terminal box; in the provision of a more effective operating mechanism for causing the stab type contacts to penetrate the cable insulation while at the same time clamping the cables in position within the box; and in the provision of a generally improved terminal box structure presenting facility in initial terminal and contact wiring so that the box may be adapted to different uses, utilizing the same or different face plates, or so that, if desired, the box may be rewired for changeover purposes.

The provision of an electrical terminal box of the character briefly outlined above being among the principal objects of the present invention, it is a further object to provide such a terminal box wherein the operating means for the insulation-piercing contacts is a counterpart of the box body proper and remains at all times a part of the box assembly so that the same will not become misplaced or lost. Another and related object is to provide such an operating means wherein the strain relief factor afforded thereby when the same is tightened against the insulation-piercing contacts is materially improved so that the cable ends are securely fastened in position within the terminal box.

A still further object of the invention, in a terminal box of this character, is to provide an improved form of stab-type insulation-piercing contact element which, regardless of whether the lead-in cable with which it is associated is of the single strand solid wire type, or of the multiple wire, twisted, woven or braided strand type, is capable of making an extremely effective electrical contact with the metal strand or strands which comprise the conductor proper.

In connection with this last mentioned object, the invention contemplates the provision of a stab-type contact element which is so designed that, after it has been forced through the insulation surrounding the conductor and as it is forced against the conductor, will compress and contract the material which comprises the conductor in the immediate vicinity of the contact element, thus providing a denser medium for electrical contact and consequently a more effective electrical union between the conductor and contact element. Present day stab-type contact elements are invariably of the pin variety and have pointed insulation-piercing, conductor-penetrating contact elements which, in the case of single strand, solid wire cables, have their pointed ends driven into the copper or other material of the conductors. Where such contacts are employed in connection with cables which are not firmly anchored in position before cable-stabbing operations, the resistance of the metal of the conductor to compressional forces frequently causes the cable to turn about its axis or to rock in one direction so that the pin contact does not actually penetrate the conductor but comes to rest at a tangent thereto. Furthermore, the material from which such pin type contacts are made is no harder than the material of the conductor so that, even with proper orientation and alignment of the contact and conductor, penetration does not take place but, instead, the point of the contact is either flattened or bent. Where such pin contacts are employed in connection with multiple strand cables, for example, cables of the lamp cord or parallel molded rubber or plastic variety, the pin contact merely spreads the various strands of the cable apart and enters between them so that there is no actual metal penetration. Such pin contacts, therefore, offer poor electrical connection where either single or multiple strand cables are concerned. Finally, pin contacts of this sort, regardless of the type of cable with which they may be used, offer but little actual contact area so that a high resistance union is afforded at the region of contact.

The present invention is designed to overcome the above-noted limitation that is attendant upon the construction and use of pin type insulation-piercing contacts and, toward this end, it contemplates the provision of a novel and effective stab-type contact element which, in the case of single strand insulated conductors, will actually penetrate the material of the conductor proper at spaced regions on opposite sides of a diametric plane and, thereafter compress the material of the conductor while at the same time making line contact with the compressed region of the conductor so that a relatively large contact area is created where intimate electrical contact is made. In the case of multiple strand cables, stab-type contacts constructed in accordance with the principles of the invention will effect a gathering of the strands which comprise the cable conductor and a compression of these strands against one another to produce a region of high strand density with which the contact can make an effective electrical contact.

The provision of a terminal box which is extremely simple in its construction, consisting of but relatively few parts, and which, therefore, may be manufactured at a relatively low cost; one which is capable of ease of assembly and disassembly for purposes of inspection, replacement of parts, repair, changes in circuit wiring or for other reasons; one which may be electrically connected in a desired circuit by application thereto of the necessary electrical conductors or cables without requiring the use of tools other than an ordinary screw driver, thus resulting in a saving in labor when the box is utilized in a building construction; one which is rugged and durable and which, therefore, is unlikely to become damaged or otherwise to get out of order; one which, considering the physical size of the conductor tapping contacts associated with the same, has a relatively high current carrying capacity and consequently a high wattage rating; and one which otherwise is well adapted to perform the services required of it are further desirable features which have been borne in mind in the production and development of the present invention.

Other objects and advantages of the invention, not at this time enumerated, will become more readily apparent as the nature of the invention is better understood.

In the accompanying two sheets of drawings forming a part of this specification, an exemplary form of the invention has been shown.

In these drawings:

Fig. 1 is a perspective view of a terminal box constructed in accordance with the principles of the present invention. In this view, the terminal box face plate has been removed and certain portions of the box housing have been broken away to more clearly reveal the nature of the invention;

Fig. 2 is a perspective view of one of a number of different forms of face plate capable of being used in connection with the terminal box of Fig. 1;

Fig. 3 is a front elevational view of the terminal box structure shown in Fig. 1;

Fig. 4 is a sectional view taken substantially along the line 4—4 of Fig. 3 and showing the face plate of Fig. 2 applied to the terminal box structure;

Fig. 5 is a sectional view taken substantially along the line 5—5 of Fig. 4;

Fig. 6 is a sectional view taken substantially along the line 6—6 of Fig. 4;

Fig. 7 is a sectional view taken substantially along the line 7—7 of Fig. 6;

Fig. 8 is a sectional view taken substantially along the line 8—8 of Fig. 7;

Fig. 9 is an enlarged sectional view, somewhat schematic in its representation, taken transversely through an insulated cable of the single strand conductor type showing the manner in which an insulation-piercing stab-type contact element constructed in accordance with the principles of the present invention makes electrical contact with the conductor proper;

Fig. 10 is a perspective view of a stab-type contact element which constitutes a part of the present invention; and Fig. 11 is a sectional view similar to Fig. 9 showing the manner in which the contact element makes electrical contact with the composite conductor proper of a multiple strand insulated cable.

Referring now to the drawings in detail, and in particular to Figs. 1 and 2, a terminal box assembly, constructed in accordance with the principles of the present invention, has been illustrated in detail in Fig. 1 and designated in its entirety at 10. The terminal box assembly 10 is adapted to have selectively associated therewith any one of a number of functional face plate assemblies, as for example, the assembly illustrated in Fig. 2 and designated in its entirety at 12. The terminal box 10 and face plate 12 of Figs. 1 and 2, respectively, are purely exemplary of the present invention and the terminal box 10 is shown as being in the form of an outlet box or receptacle adapted to be partially embedded in a wall structure, the usual recess being provided for reception therein of the structure. The box 10 is shown as being constructed and suitably wired for cooperation with the face plate 12 and the latter is in the form of a dual outlet female socket type of face plate adapted to removably receive therein the male prongs of one or more terminal plugs (not shown) operatively installed on the terminal end of an appliance cord or cords for plug-in purposes in the usual manner of operation of conventional dual outlet devices of this nature, all in a manner that will be made clear presently. It will be understood, however, that the terminal box 10 may be designed and wired for other purposes and that the specific form of box illustrated herein may be wired to receive other types of face plate assemblies. For example, the terminal box 10 may be employed as a utility box to receive a single pole switch assembly which may be embodied in the face plate 12, in which case no structural modification of the box is required, although the wiring thereof will be altered. The box 10 may, with or without modification, be employed as a utility box for a three-way switch, or it may assume the form of a junction box, lighting fixture with feed-in and feed-out connections, or it may assume special forms for various other specific purposes. As best seen in Figs. 6, 7 and 8, the terminal box illustrated herein has been designed to receive two sets each of dual conductor feed-in and feed-out cables, respectively, such as those shown at 16 and 18, but it will be understood that the terminal box may be fed by a single dual conductor cable, or, if desired, it may be fed by a pair of single conductor cables. Irrespective, however, of the particular use to which the terminal box may be put, of the manner in which it is fed, or of the manner in which it may be electrically wired to accommodate different installations, the essential features of the invention are at all times preserved.

Referring now to Figs. 1, and 3 to 8, inclusive, the terminal box 10 includes a generally rectangular box-like housing which is of a composite nature and includes three principal components, namely, an open rectangular tubular wall-forming member 20 which is open at its ends, a bottom plate 22 and a rear cover plate 24. The three parts 20, 22 and 24 are adapted to be secured together in their assembled relationship by means of a pair of fastening screws 25 (Fig. 4) which pass through openings 27 and 29 in the cover plate 24 and back plate 22, respectively, and are threadedly received as at 31 in the member 20. Since the assembly 10 is shown herein as being in the form of an outlet box operatively mounted in a vertical wall, the box-like structure may be described as having vertical side walls 26 and 28, respectively, a top wall 30, a bottom wall 32, a rear wall 34 afforded by the back plate 22, and an open front afforded by the rectangular rim created by the four walls 26, 28, 30 and 32. The open front of the structure 10 is adapted to be closed when the face plate 12 is assembled thereon in a manner that will be made clear presently.

The three component parts 20, 22 and 24 of the box-like structure 10 are preferably formed of an insulating material, such as Bakelite or other plastic material having the necessary strength and rigidity, and the back plate 22 has embedded therein the base portions 36 (Figs. 5, 7 and 8) of a pair of generally U-shaped spreader type contact elements 38 having spreader arms 40, the distal ends of which are flared outwardly as at 42 and which are designed for telescopic sliding frictional reception therebetween of a pair of blade contacts 44 associated with the face plate 12 for purposes that will be made clear presently. The spreader arms 40 project forwardly from the rear wall 34 into the enclosure afforded by the box-like structure 10 adjacent the side walls 26 and 28 and at a region which is equidistantly spaced from the top and bottom walls 30 and 32, respectively. A cylindrical attachment post 46 projects forwardly from the rear wall 34 centrally of the latter and is designed for cooperation with the face plate assembly 12 in a manner that will likewise be made clear subsequently.

In order to receive the terminal end regions of the various lead-in and lead-out cables 16 and 18, respectively, the top and bottom walls 30 and 32 are formed with a pair of spaced notches 48 (Figs. 1, 6 and 7) at the rear edges thereof and these notches are designed for cooperation with mating notches or grooves 50 formed in the front face of the back plate 22 to provide suitable entrance openings 52 for the various cables 16 and 18.

As previously stated, the lead-in cables 16 and the lead-out cables 18 are of the insulated dual conductor type. As best seen in Figs. 6 and 9, each of these cables includes a pair of relatively massive, solid, single strand conductors 54 which extend in spaced parallelism through a surrounding sheath 55 of insulating material. Conventional lead-in cables of the type with which the present terminal box may be associated may vary widely in their characteristics and the insulating sheaths associated therewith may include inner and outer woven or knit fabric casings, impregnated fibers, and the like. However, for illustrative purposes herein, the sheath 55 is shown as being formed of a solid elastomeric material, such as rubber or a rubber substitute.

In order to tap the conductors 54 and provide a path for the flow of electric current from each conductor to one of the contact elements 36, each trough 50 has associated therewith a pair of stab-type insulation-piercing conductor-engaging, contact elements 56 (see also Fig. 11), which elements, apart from their association with the terminal box assembly 10, constitute one of the principal features of the present invention. Each contact element 56 is formed of electrically conductive metal, such as copper or a copper alloy, possessing an appreciable degree of hardness and preferably tempered so that the same may more readily pierce the insulation 56 of the cables 16 and 18 and bite into the copper or other material comprising the conductors 54 and thus make firm physical and good electrical contact therewith for electrical tapping purposes. Each contact element 56 is in the form of a flat strip of material which is bent into U-shape form to provide a base portion 58 which may be provided with a central hole 60 therein for solder-flow purposes and a pair of upstanding insulation piercing portions proper 62. The portions 62 are preferably of tapered design and the distal ends thereof present arcuate edges 64, each having a radius of curvature somewhat less than the radius of the cylindrical conductors 54. The specific functioning of the piercing portions 62 of the contacts 56 will be described in greater detail subsequently, but for the present, it is deemed sufficient to state that these portions 62 are, by relative motion between the contacts 56 and cables 16, adapted to be projected through the insulating sheath 55 of the cables and into electrical contact with the conductors 54.

Referring now to Figs. 6 to 10, inclusive, the base portion 58 together with a limited portion of the adjoining region of each insulation-piercing portion 62 of each contact element 56 is embedded in the material of the back plate 22 while the distal end region of the portion 62 projects forwardly into one of the wire-receiving troughs 50 a distance slightly greater than the thickness of the insulation 56. The contact elements 56 are arranged in pairs as shown in Figs. 6 and 9 with two of the elements 56 being associated with each individual trough 50. The elements 56 of each pair are spaced apart a distance approximately equal to the axial center-to-center distance between adjacent conductors 54 in the cables 16 and 18 and a small hole such as has been shown at 66 in Figs. 7 and 9 is formed in the back plate 22 in register with each of the contact elements 56 to facilitate the insertion therethrough of the contact elements 56.

In order to cause the portions 62 of the contact elements 56 to pierce the insulation 55 and penetrate the conductors 54 after these end regions have been introduced into the terminal box through the openings 52, as well as to securely anchor the terminal end regions of the cables in position within the grooves 50 provided in the back plate 22, each cable has associated therewith a threaded driving screw or plug 70 which is threadedly received in a threaded bore 72 provided in a thickened web portion 74 which spans the distance between the two side walls 26 and 28, there being one such web portion formed on the top wall 30 and another such web portion formed on the bottom wall 32. The bores 72 provided in the web portion 74 are in axial alignment with the respective pairs of contacts 56 so that when the ends of the cables 16 or 18, as the case may be, are introduced through the openings 52, the threaded plugs 70 may be rotated within the bores 72 and thus impelled rearwardly within the box-like structure so that the leading ends thereof will engage the sides of the cables 16 and force the same against the bottoms of the grooves 50, thus causing the upstanding projecting portions 62 of the contacts 56 to penetrate the insulation 55 and engage the conductors 54 while at the same time causing the cables 16 to be firmly seated within the grooves 50 and clamped therein against dislodgment.

As best seen in Figs. 1, 4 and 7, the front wall 34 afforded by the back plate 22 has formed thereon a pair of transversely extending ribs 80 providing flat shoulders 82 which fit snugly between the two thickened portions 74 when the rectangular tubular housing part 20 is assembled upon the back plate 22, thus centering the two parts in their proper position of registry.

Referring now to Figs. 2, 4, 5 and 7, the terminal box structure previously described is designed for use with various types of face plates and the face plate 12 selected for illustration herein is adapted to function as a dual outlet for the plug-in connection of one or more electric wire or cord terminal plug devices. Accordingly, the face plate 12 is comprised of a face plate proper 90 of rectangular design having a thickened hub portion 92 and a laterally extending flange portion 94 adapted to bear against and overlap the marginal open rim portion of the terminal box assembly 10 when the face plate is operatively installed thereon. The hub portion 92 is formed with a central opening 96 therethrough, through which opening there is adapted to extend an elongated fastening screw 98, the distal end of which is threadedly received as at 99 in the post 46 in order to fasten the face plate in position on the terminal box 10. Upper and lower pairs of prong-receiving openings 100 and 102, respectively, are formed in a hub portion 92, as is conventional with outlet box face plates, and these pairs of openings are designed for respective register with upper and lower spreader type contact elements 104 and 106, respectively, carried on a pair of connector strips 108, from which strips there extend rearwardly respective blade contacts 110 designed for mating engagement with the spreader contacts 38 associated with the terminal box 10. The upper contacts 104, together with the openings 100 with which they are in register, constitute the upper outlet connection for the face plate and similarly the lower contacts 106, together with the openings 102 with which they are in register, constitute the lower outlet for the face plate 12. Each pair of upper and lower contacts 104, 106, the connecting strip 108 therefor, and the blade contact 110 in the form of a unitary contact member which may be in the form of a stamping and which member is held in position relative to the face plate proper by means of a shallow open ended box-like base portion 112 of insulating material appropriately recessed to receive the connector strips 108 and contacts 104, 106 and having side walls 114 (Fig. 2) which are notched as at 116 to accommodate rearward projection of the blade contacts 110. The bottom wall 118 of the box-like structure 112 is formed with a pair of holes 120 therein for reception therethrough of a pair of fastening screws 122 by means of which the member 112 may be secured to the rear side of the hub portion 92 of the face plate proper 90. A partition wall 124 divides the interior of the box-like base structure 112 into adjacent compartments, each enclosing the connector strip portion 108 of one of the T-shape contact members. The partition wall 124 is formed with a bore 126 therethrough in register with the opening 96 to permit the fastening screw 98 to project completely through the face plate assembly 12.

As clearly shown in Figs. 5 and 7, when the face plate assembly 12 is installed upon the terminal box 10 utilizing the fastening screw 98, the two blade contacts 110 and the two spreader contacts 38 move into telescopic register and engagement with each other to thus energize the various contacts 104 and 106 by means of suitable terminal box wiring which, in the present illustrated form of the invention, is in conformity with proper outlet box wiring.

An illustration of one form of wiring which may be resorted to for properly connecting the various electrical instrumentalities associated with the terminal box when the same is employed as an outlet box has been shown in Fig. 8. This wiring may be effected prior to assembly of the rear cover plate 24 of the back plate 22 and it may be actually performed on the back plate with the latter completely disassociated from the assembly with which it is ultimately associated. The wiring may be a soldering procedure utilizing either heavy flexible conductors or bus bars, or the entire assembly consisting of 56, 134, 132, 36, may be stamped and formed in a single operation. Accordingly, one such bus bar 130 may connect the outside contact elements 56 next adjacent the side wall 26 with the adjacent spreader contact 36. Another bus bar 132 may connect the inside contact element 56 on the same side of the structure with the spreader contact 36 next adjacent the side wall 28. If a single lead-in cable 16 and a single lead-out cable 18 are employed, the two bus bars 130 and 132 may constitute the entire wiring for the system. If two lead-in cables 16 and two lead-out cables 18 are desired, in effect forming a junction box, the contact elements 56 next adjacent the side wall 28 may be connected by a bus bar 134 to the adjacent spreader contact 36 and a bus bar 136 may connect the inside contact elements 56 on the same side of the structure with the spreader contact 36 next adjacent the side wall 26. Either pair of conductors 130, 132 or 134, 136 may be omitted while still maintaining energization of the various outlet contacts 104 and 106.

Referring now to Fig. 9, as previously stated, the present invention in addition to providing a novel form of terminal box structure, contemplates the provision of a novel form of stab-type contact element which, in the illustrated embodiment of the invention, assumes the form of the previously described contact element 56. Such a contact element may find use, not only in connection with a terminal box construction such as that described herein but in connection with other applications as, for example, terminal or medial wire taps which require no baring of the wire conductor or conductors when applied to a cable.

During application of one of the contact elements 56 to a given conductor such as one of the solid conductors 54 associated with the cable of Fig. 9 by relative movement between the contact element 56 and cable 16 under the influence of a pressure applying applicator such as the threaded plug applicator 70, the arcuate edges 64 will readily pierce the insulation 55 and pass completely therethrough and into contact with the conductor 54. If desired, these arcuate edges 64 may be sharpened to facilitate such entry into the cable. Inasmuch as the radius of curvature of the edges 64 is slightly less than the radius of the conductor 54, the two points designated at 65 in Fig. 10 and which exist by virtue of the intersection of the arcuate edge 64 with the side edges of the portion 62 will first engage the cylindrical outside surface of the conductor 54 and penetrate the material of the conductor until such time as the arcuate edge 64 makes coextensive contact with the conductor. During such movement of the distal ends of the portion 62 against the conductor 54, a small portion of the metal of the conductor shown at 67 in Fig. 9 may be displaced while at the same time the region of the conductor immediately in front of the arcuate edge 64 will become compressed by a camming action exerted by the arcuate edge 64 so that a firm physical frictional contact and a consequent good electrical contact will be made by the portion 62 of the contact element 56 with the metal of the conductor 54. Since the points 65 initially engage the conductor on opposite sides of a diametrical plane extending transversely of the conductor, there will be no tendency for the conductor to roll within the insulation 56 nor will it be possible for the portions 62 to strike the conductor with a glancing blow as is sometimes the case in connection with stab contacts of the pointed pin type. Because of the fact that the two faced portions 62 of the contact element 56 are electrically connected through the base portion 58 of the contact element, contact will be made with the conductor 54 at two spaced regions thus increasing the current carrying capacity of the contact element 56 two-fold over conventional pin type contacts.

In Fig. 11, the operation of one of the contact elements 56 when associated with a multiple strand electric cable has been schematically illustrated. The cable has been designated in its entirety at 150 and is comprised of an inner core or conductor 152 including a large number of small strands 154 of wire twisted together in the usual manner of construction of such cables, with the conductor 152 being surrounded by an insulating sheet 156. The mounting for the contact element 56 for illustrative purposes, remains the same as employed in connection with the terminal box 10 but it will be understood, of course, that other types of mounting may be resorted to and other means for effecting relative movement between the cable and contact element 56 for insulation-piercing purposes may be resorted to. In this instance, after complete insulation penetration has been effected, the two points 65 at the opposite ends of the arcuate edge 64 of each portion 62 of the contact element 56 enter between adjacent strands 154 as the arcuate edge 64 moves toward the center line or axis of the conductor 152. Since the radius of curvature of the arcuate edge 64 of each portion 62 is smaller than the radius of the conductor 152, the arcuate edge 64 will exert a camming action on such wire strands 154 as it encounters tending to bunch these strands together or compress them into a more solid mass while at the same time the sloping side edges 67 of the portions 62 will exert an outward force against such strands as they may encounter, thus assuring good electrical contact of not only the arcuate edge 64 but also of the side edges 67 with adjacent wire strands 154. There will thus be no spreading action exerted on the wire strands 154 as is the case in connection with conventional pointed pin type contact and a denser group of wire strands will be engaged by all the distal edge surfaces of the portions 62.

While a preferred embodiment of the invention has been described herein and illustrated in the accompanying drawings, it should be understood, however, that the invention is not to be limited to the precise apparatus described since numerous variations are contemplated within the spirit of the invention. For example, the specific wiring illustrated herein in Fig. 8 will be varied to accommodate different installations and different uses for the terminal box assembly 10. Where the terminal box is employed as an outlet box, the wiring illustrated will suffice to make the necessary electrical connections. If the terminal box 10 is to be employed as a switch box for receiving a switch-type face plate of the single pole variety, only one lead-in cable need be employed and suitable bus bars may be utilized to connect one conductor of the cable to one of the spreader contacts 36 and to connect the other conductor of the cable to the other spreader type contact 36 through the media of one pair of the stab-type contacts 56. If the terminal box is to be used as a lighting fixture, it may have a circular contour instead of the rectangular contour illustrated herein. The terminal box if designed for three-way switching purposes will employ three of the cooperating pairs of contacts 36, 110 instead of two such pairs and the wiring may include a suitable flexible jumper designed for selective electrical contact with suitable terminals provided within the junction box assembly. The appended claims, therefore, should be construed as broadly as the prior art will permit.

Having thus described the invention what I claim as new and desire to secure by Letters Patent is:

1. In a terminal box of the character described, a box-like housing formed of non-conducting material and including an open-ended tubular member, providing a continuous side wall, a bottom plate closing one open end of said tubular member and providing a back wall for the housing, stab-type contacts fixedly secured in said bottom plate and projecting forwardly therefrom, a web formed on said tubular member forwardly of and overlying said contacts, an impaling screw for each contact threadedly received through said web and in alignment with its respective contact, a face plate detachably secured to said tubular member and closing the other open end thereof, cooperating interengaging telescopic blade-and-clip contacts on said bottom plate and face plate and movable into and out of electrical engagement with each other when said face plate is applied to and removed from said housing respectively, conductors exteriorly of the housing and projecting into said bottom plate and electrically connecting said stab-type contacts and the contacts on said bottom plate, and a rear cover plate removably secured to said bottom plate and, in combination with said bottom plate, confining said conductors.

2. In a terminal box of the character described, in combination, a box-like housing formed of non-conducting material and including an open ended tubular member providing a continuous side wall, a bottom plate closing one open end of said tubular member and providing a back wall for the housing, cable-receiving grooves formed in said bottom plate, stab-type contacts secured in said bottom plate and projecting forwardly from the bottoms of said grooves, a web formed on said tubular member overlying said grooves, impaling screws threadedly received in and projecting through said web and in register with said contacts, a face plate detachably secured to said tubular member and closing the other open end thereof, cooperating interengaging telescopic blade-and-clip contacts on said bottom plate and face plate and movable into and out of electrical engagement with each other when said face plate is applied to and removed from said housing respectively, conductors exteriorly of the housing and projecting into said bottom plate and electrically connecting said stab-type contacts and the contacts on said back wall, and a rear cover plate removably secured to said bottom plate and, in combination with said bottom plate confining said conductors.

3. In a terminal box of the character described, in combination, a box-like housing formed of non-conducting material and including an open-ended tubular member providing a continuous side wall for the housing, a bottom plate closing one open end of said tubular member and providing a back wall for the housing, cable-receiving grooves formed in said bottom plate, stab-type contacts secured in said bottom plate and projecting forwardly from the bottoms of said grooves, a web integrally formed on said tubular member and spaced from and overlying said grooves, impaling screws threadedly received in and projecting through said web and in register with said contacts, a face plate detachably secured to said tubular member and closing the other open end thereof, cooperating interengaging telescopic blade-and-clip contacts on said bottom plate and face plate and movable into and out of electrical engagement with each other when said face plate is applied to and removed from said housing respectively, conductors electrically connecting said stab-type contacts and the contacts on said bottom plate, there being a hole formed in said bottom plate in register with each of said stab-type contacts, there being a hole formed in said bottom plate in register with each of said telescopic contacts on said bottom plate, said conductors being disposed exteriorly of the box-like housing and lying coextensively in close proximity to said bottom plate, the conductors being physically bonded to the various contacts on said bottom plate by solder which substantially fills said holes, and a cover plate removably secured to said bottom plate and concealing said conductors.

References Cited in the file of this patent

UNITED STATES PATENTS

| | | |
|---|---|---|
| 1,336,736 | Fenety | Apr. 13, 1920 |
| 1,869,936 | Griswold | Aug. 2, 1932 |
| 2,292,236 | Martin | Aug. 4, 1942 |
| 2,700,142 | Benander | Jan. 18, 1955 |
| 2,742,549 | Peters | Apr. 17, 1956 |
| 2,860,317 | Johnson | Nov. 17, 1958 |